Nov. 18, 1947.  C. H. ZIMMERMAN  2,431,293
AIRPLANE OF LOW ASPECT RATIO
Filed Dec. 18, 1940   2 Sheets-Sheet 1
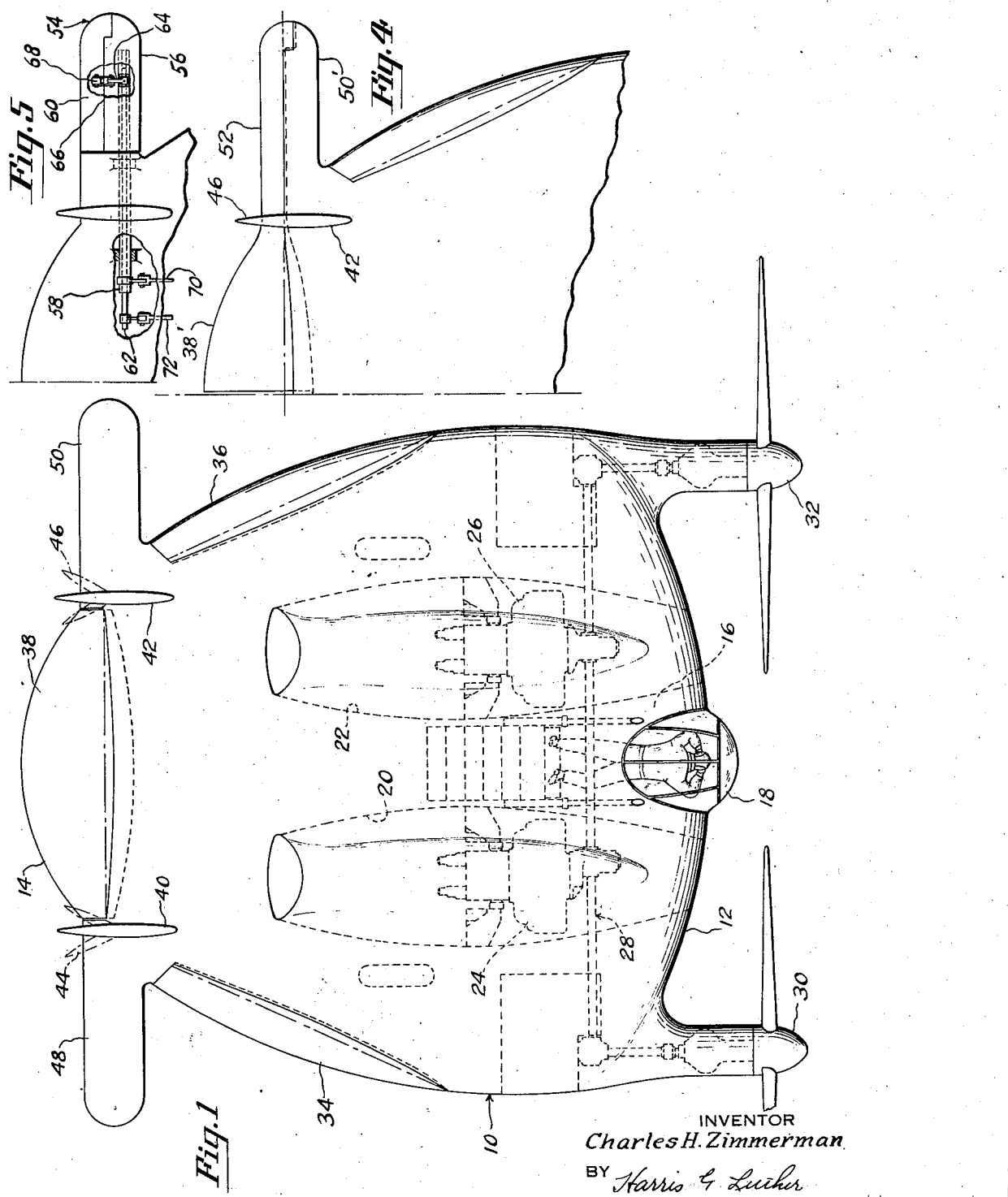
INVENTOR
Charles H. Zimmerman
BY Harris G. Luther
ATTORNEY Nov. 18, 1947.  C. H. ZIMMERMAN  2,431,293
AIRPLANE OF LOW ASPECT RATIO
Filed Dec. 18, 1940   2 Sheets-Sheet 2
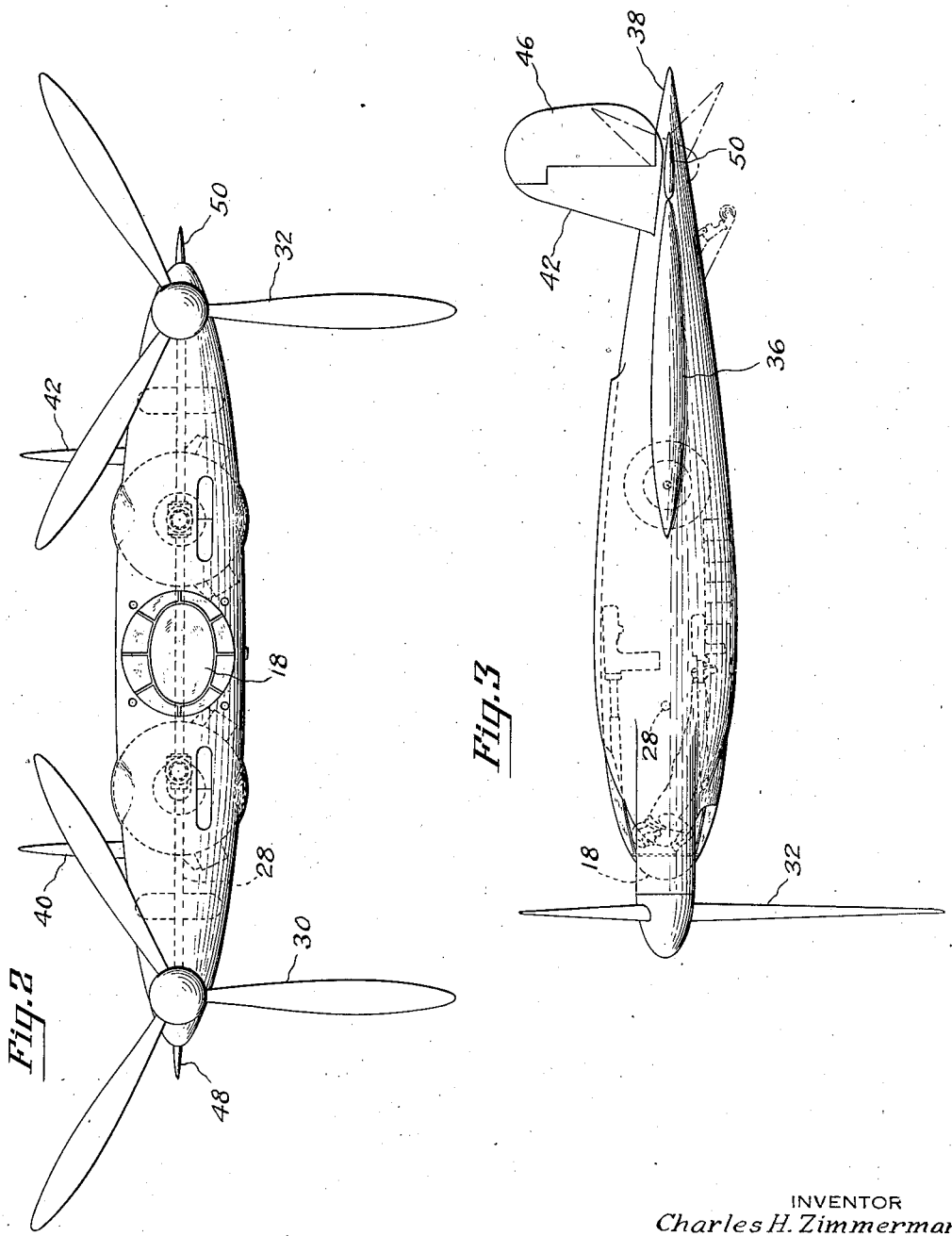
INVENTOR
*Charles H. Zimmerman*
BY
ATTORNEY Patented Nov. 18, 1947

2,431,293

UNITED STATES PATENT OFFICE 2,431,293

AIRPLANE OF LOW ASPECT RATIO

Charles H. Zimmerman, Nichols, Conn., assignor to United Aircraft Corporation, East Hartford, Conn., a corporation of Delaware Application December 18, 1940, Serial No. 370,646

15 Claims. (Cl. 244—13)

This invention relates to improvements in aircraft and has particular reference to an improved aircraft of low aspect ratio.

An object of the invention resides in the provision of an improved aircraft of low aspect ratio having improved fore and aft or pitching stability.

A further object resides in the provision of an improved aircraft of low aspect ratio having rearwardly disposed lift increasing and stabilizing members positioned to utilize the energy of the vortex in the wake of the main wing portion for increasing the lift and stabilizing the aircraft with no substantial loss in aircraft efficiency.

A still further object resides in the provision of an improved aircraft of low aspect ratio having rearwardly disposed lift increasing and stabilizing members positioned to utilize the energy of the wing tip vortex in which said members or suitable portions thereof are made movable about suitable axes to provide longitudinal and lateral control for said aircraft.

Other objects and advantages will be more particularly pointed out hereinafter or will become apparent as the description proceeds.

In the accompanying drawings, in which like reference numerals are used to designate similar parts throughout, there is illustrated a suitable structural embodiment for the purpose of disclosing the invention. The drawings, however, are for the purpose of illustration only and are not to be taken as limiting or restricting the invention since it will be apparent to those skilled in the art that various changes in the illustrated embodiment may be resorted to without in any way exceeding the scope of the invention.

In the drawings,

Fig. 1 is a top plan view of an aircraft constructed according to the invention.

Fig. 2 is a front-elevational view of the aircraft shown in Fig. 1.

Fig. 3 is a side-elevational view of the aircraft illustrated in Fig. 1, and

Fig. 4 is a top plan view of a fragmentary portion of the aircraft showing a somewhat modified form of the invention.

Fig. 5 is a top plan view of a fragmentary portion of the aircraft showing another somewhat modified form of the invention.

Referring to the drawings in detail, the aircraft has a single wing 10 of somewhat semi-circular or horseshoe outline having a forward portion provided with a slightly convex leading edge 12 and a more sharply curved rearward portion having a convex trailing edge 14. This wing contains a centrally disposed pilot cockpit 16 provided with a dome shaped transparent front end 18 and a pair of engine chambers 20 and 22 disposed one at each side of the cockpit 16 and each containing an engine, as indicated respectively at 24 and 26. The engines are connected by means of suitable shafts and gearing, as indicated at 28, with a pair of propellers 30 and 32 carried by projections disposed one at each side of the wing 10 somewhat ahead of the leading edge 12. The wing portion is provided with a pair of skewed ailerons 34 and 36, a movable horizontal elevator 38 at the rear of the wing portion and with a pair of vertical fins 40 and 42 to which are attached vertical rudders 44 and 46.

As is particularly illustrated in Fig. 1, the main wing 10 has its maximum width a short distance rearward of the leading edge 12 and from this position of maximum width gradually tapers rearwardly in a generally semi-circular or horseshoe pattern. This wing is generally known as, and will be referred to hereinafter as, one of low aspect ratio and is in the class of wings whose aspect ratio is generally less than 3. As this airfoil progresses through the air the pressure field set up by the airfoil causes air to be forced outwardly from below the lower surface and to be drawn inward toward the upper surface around the tip of the airfoil. This motion of the air, imposed on the forward motion of the airfoil gives a resultant whirling or vortex motion to the air in the region aft of the wing tip, the core or axis of the vortex trailing slightly inward and upward from the tip in the direction of the relative wind. This vortex movement of the air produces a pronounced downwash inboard of the vortex axis and a pronounced upwash outboard of the axis. While such a vortex is present at the tip of every airfoil which produces lift, its effect is much greater in the case of a low aspect ratio airfoil, such as that illustrated, since a large portion of the air beneath such a low aspect ratio airfoil flows out laterally past the airfoil tips instead of from the trailing edge. Since this vortex disturbance of the air represents a loss in aircraft efficiency it is desirable to minimize it as much as possible. An important improvement in the efficiency of an aircraft such as that illustrated can be obtained by rotating the propellers in opposite directions such that the rotational effect in the slipstream of each propeller is opposite in direction to the rotation of the vortex extending around the respective wing tip. Such a slipstream will have an outboard downwash and an inboard upwash which will react against the undersurface of the wing to improve the wing lift. Furthermore, the creation of the vortex at the wing tip will require a complete reversal of the rotation of the slipstream so that substantially all of the rotational energy of the slipstream is recovered and a much smaller amount of energy is lost in rotational movement of the air around the vortex axis. There will still, however, be a pronounced vortex extending rearwardly in the wake of each wing tip and it is among the objects of this invention to recover a further amount of energy from these vortices and at the same time materially improve the fore and aft stability of the aircraft.

Low aspect ratio aircraft of the type illustrated have always experienced more or less difficulty with fore and aft instability due to the relatively short distance between the center of lift of the main wing portion and the center of lift of the rearwardly disposed elevator and because it has not been practical to provide an independent fixed or adjustable stabilizer at the rear to damp the pitching movement of the main wing portion. This lack of damping has tended to permit the main wing portion to set up a condition of oscillation which has rendered the pitching control of such an aircraft difficult. Furthermore, in order to obtain suitable static stability in this type of aircraft and especially in one having an airfoil of substantially symmetrical cross-section, it would be necessary to locate the center of gravity further forward than is practically possible which means that actually, the center of gravity is rearward of the location at which satisfactory static stability would be obtained. In accordance with the present invention the aircraft is provided at the rear thereof with two laterally extending stabilizing members as indicated at 48 and 50. In the arrangement shown these members extend from the portion of the main wing between the rearward ends of the ailerons 34 and 36 and the respective adjacent ends of the elevator 38 to a position somewhat beyond the maximum lateral extent of the main wing portion. These members are of generally streamlined cross section and may, if desired, be given an airfoil contour, the exact contour depending somewhat on the characteristics of the particular installation, and are so positioned and dimensioned that approximately the outer half of each member is located in a pronounced upwash of air incident to the respective vortex. By thus utilizing the energy of the upwash from the main wing to produce lift the total lift required of the main wing portion can be proportionately reduced with a corresponding reduction in drag of the aircraft. It has also been found that the portion of this upwash which flows over the top of the stabilizing members 48 and 50 produces on these members a lift having a forwardly directed component which also to some extent reduces the total drag of the aircraft or at least does not cause an increase in drag because of the provision of the stabilizing members. The additional area at the rear of the main wing provided by the addition of the members 48 and 50 provides an effective damping action so that the pitching movements of the main wing cannot occur too rapidly and any oscillating motion will be immediately damped out, and also permits a further rearward and more practical location of the center of gravity of the airplane. This correction of the usual conditions of fore and aft instability with no material increase in the total drag of the aircraft renders this type of aircraft highly practical and desirable since it has been known for some time that aircraft of this type are materially faster than conventional aircraft with the same amount of power.

The exact fore and aft location of the stabilizing vanes is not critical so long as the vanes intercept the upwash incident to the above described wing tip vortex.

Looking at this stability problem from a little different angle, it has been found that satisfactory stability in a low aspect ratio airplane may be obtained under high speed conditions with a Clark V type of airfoil with the center of gravity located at approximately twenty-three percent of the chord but at the expense of control at high angles of attack. In order to maintain the high angles of attack in such an airplane large moments are required with the consequent difficulty of control and load on the structure.

With a substantially symmetrical airfoil shape such as is shown in this application it was found that the aerodynamic center, which is a point stationary with respect to the airfoil, about which the moment coefficients of the airfoil are substantially constant, was so located in a low aspect ratio airfoil that the center of gravity had to be placed at ten percent to fifteen percent of the chord in order to obtain stability at high speeds. Location of the center of gravity at such a point produced major design problems and with the present available equipment was impractical. With the discovery that stabilizing vanes placed in the vortex upwash did not materially affect the drag, and under some conditions actually decreased the drag, and at the same time changed the aerodynamic center of the combination to a more favorable position, it was possible to construct a low aspect ratio airplane in which the center of gravity was located at a practical distance from the wing leading edge. The moments required to maintain the airplane at high angles of attack with the symmetrical airfoil are reasonable and in fact approach zero.

In the form of the invention shown in Fig. 4 the general arrangement is the same as that described above in connection with Figs. 1, 2 and 3 but in the modified form the movable elevator 38' is provided with lateral extensions, one of which is indicated at 52, which constitute the rearward portion of the corresponding stabilizing members 48' and 50'. These extensions materially increase the effect of the elevator 38 since they are positioned in the free airflow to the sides of the main wing 10 and also because they change the airfoil shape of the lateral stabilizing members and thereby change the lift effect of these members. Whether or not these lateral extensions are provided will depend on the characteristics of the particular design of airplane. If it is found desirable to increase the sensitivity of the pitching control such extensions may be provided but, if the control by the horizontal elevator above is sufficiently sensitive, the stabilizing vanes will be provided without movable portions. Differential operation of separate movable rearward portions of the extensions 48' and 50' to serve as ailerons instead of or in combination with the wing carried ailerons 34 and 36 is also contemplated. That these movable members would operate effectively as ailerons is evident from the fact that they are disposed further outboard than the conventional ailerons for this type of aircraft, and are disposed in relatively high velocity airstreams.

If desired, instead of hinging the rear portion only of the stabilizing members 48 and 50, the entire stabilizing member may be mounted so as to turn about an axis extending longitudinally of the member and located at any convenient and suitable position, such as approximately twenty percent of the chord from the leading edge. In such an arrangement the two members may be differentially operated to act as ailerons as well as being operated together to act as pitching control members.

In the modification shown in Fig. 5, the vanes, one of which is generally indicated at 54, constitute the sole means for lateral and longitudinal control of the aircraft as well as for providing the above described damping and stabilizing effect. In this arrangement each member may conveniently comprise a forward portion 56 carried by a rotatable shaft 58 the axis of which extends longitudinally of the forward portion somewhat to the rear of the leading edge thereof, and a rearward portion 60 hinged to the forward portion rearwardly of the shaft 58. The portion 60 may be inclined relative to the portion 56 by suitable means such as a shaft 62 concentric with the shaft 58 and having at its outer end an arm 64 projecting through a slot in the shaft 58 and connected by a suitable link 66 with a horn 68 secured to the portion 60. The shafts 58 and 62 may be connected with a suitable manual control by respective link or cable means as indicated at 70 and 72. The manual control may conveniently be such that both forward portions are moved coextensively in the same direction for longitudinal control and stabilization and may, if desired, be given a limited differential movement for adjusting the trim of the aircraft while the rear portions are given a differential movement for lateral control.

While a suitable mechanical arrangement has been hereinabove described and illustrated in the accompanying drawings for the purpose of disclosing the invention, it is to be understood that the invention is not limited to the particular embodiment so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In an airplane, a wing including forward and rearward portions forming a low aspect ratio wing, said forward portion providing the leading edge and having said leading edge merging into laterally extended wing tips, and said rearward portion having a convex margin including the trailing edge and also merging with said wing tips, and a pair of oppositely laterally extending stabilizing vanes secured to the margin of said rearward portion rearwardly of the center of lift of said wing and extending outwardly a substantial distance beyond the maximum span dimension of said wing.

2. In an airplane, a wing including forward and rearward portions forming a wing of low aspect ratio, said forward portion including the wing tips which, when the airplane is in flight, produce wing tip vortices characterized by an inboard downwash and an outboard upwash about an axis trailing rearwardly from each wing tip, and said rearward portion having a convex margin the forward ends of which merge into said wing tips, and a pair of oppositely laterally extending stabilizing vanes secured to said rearward wing portion a substantial distance to the rear of said wing tips and extending substantially beyond the maximum span dimension of said wing into the region of aerodynamic upwash of the outboard portions of the respective wing tip vortices.

3. In an airplane, a wing having an aspect ratio of three or less which in flight produces wing tip vortices characterized by an inboard downwash and an outboard upwash along an axis trailing rearwardly from each wing tip, an aileron along each side of said wing, a tiltable flap hinged to the rearward edge of said wing having its ends spaced from said ailerons to provide marginal portions on said wing between the ends of said flap and the rearward end of each aileron, and a stabilizing vane extending laterally from each of said marginal wing portions sufficiently beyond the maximum span dimension of said wing to dispose the outer half of each vane in the upwash of the respective wing tip vortex.

4. A low aspect ratio airplane having a main wing, a tiltable flap hinged to the rearward edge of said main wing, and a pair of stabilizing vanes extending laterally from the rearward portion of said main wing one at each side thereof each of said vanes comprising a forward portion fixed relative to said main wing and a tiltable rearward portion, said tiltable rearward portions being disposed one at each end of said rear wing flap.

5. In an airplane, a wing including forward and rearward portions, said forward portion having wing tips from which rearwardly trailing wing tip vortices extend, when said airplane is in flight, and said rearward portion forming an extension of said forward portion and having a convex margin merging with said wing tips, stabilizing means for said airplane comprising, a pair of airfoil vanes disposed one at each side of the longitudinal center line of said wing a substantial distance rearwardly of said wing tips and having a substantial portion thereof extending laterally beyond the axes of the respective wing tip vortices.

6. In an airplane, a wing having wing tips from which rearwardly trailing wing tip vortices extend when said airplane is in flight, an aileron along each side of said wing, an elevator at the rear of said wing, stabilizing means comprising, a pair of rigidly attached airfoil vanes disposed one at each side of the longitudinal center line of said airplane between the ends of said elevator and said ailerons, said vanes extending laterally beyond the axes of the respective wing tip vortices to an extent such that a substantial portion of each stabilizing vane is located in the aerodynamic upwash of the outboard portion of the respective wing tip vortex.

7. In an airplane having a wing of low aspect ratio having wing tips from which rearwardly trailing wing tip vortices extend when the airplane is in flight, and a rear control surface tiltable about an axis substantially parallel to a line joining said wing tips, stabilizing means for said airplane comprising, a pair of airfoil vanes disposed one at each side of the longitudinal center line of said airplane adjacent said wing tips and extending laterally rearwardly of said wing tips and extending laterally beyond the axes of the respective wing tip vortices, a portion of each stabilizing vane being fixed relative to said wing and a portion being integral and movable with said rear control surface.

8. The arrangement as set forth in claim 7 including means supporting said vanes for tilting movements about axes extending longitudinally of the respective vanes.

9. The arrangement as set forth in claim 7 including stabilizing vanes each comprising a relatively fixed forward portion and a movable rearward portion tiltable about an axis extending longitudinally of the vane.

10. The arrangement as set forth in claim 7 including stabilizing vanes each comprising a forward portion tiltable about an axis extending longitudinally of the vane and a rearward portion carried by said forward portion and tiltable relative thereto.

11. The arrangement as set forth in claim 7 including stabilizing vanes each comprising a forward portion tiltable about an axis extending longitudinally of the vane and a rearward portion carried by said forward portion and tiltable relative thereto, manually controllable means for tilting the forward portions of said vanes and separate manually controllable means for tilting the rearward portions only of said vanes.

12. In an airplane, a wing including a broad forward portion having wing tips from which rearwardly trailing wing tip vortices extend when the airplane is in flight and a rearward portion merging with said wing tips and of gradually reducing width to the end of the wing, stabilizing means for said airplane comprising, a pair of airfoil vanes disposed one at each side of the longitudinal center line of said airplane rearwardly of the combined center of lift of said airplane and spaced substantially rearwardly of said wing tips and extending laterally a substantial distance beyond the axes of the respective wing tip vortices.

13. In an airplane having a wing of low aspect ratio from the tips of which rearwardly trailing wing tip vortices extend when the airplane is in flight, stabilizing means for said airplane comprising, a pair of airfoil vanes carried by said wing one at each side of the longitudinal center line of said airplane a substantial distance rearwardly of said wing tips and substantially in the medial plane of said wing and extending laterally a substantial distance beyond the axes of the respective wing tip vortices, said vanes being movable relative to said wing about axes extending generally lengthwise of the respective vanes.

14. In an airplane, a wing including forward and rearward portions forming a wing of low aspect ratio, said forward portion having a leading edge and also having its lateral extremities forming wing tips, and said rearward portion being of generally semi-circular plan form and merging in convex lines into said wing tips, laterally spaced propeller carrying projections on said leading edge forward of said wing tips, and stibilizing vanes having a greater span than said wing extending laterally from the sides of said rearward wing portion at locations remote from said wing tips.

15. In an airplane, a wing including forward and rearward portions forming a wing of low aspect ratio from which rearwardly trailing wing tip vortices extend when the airplane is in flight, said forward portion having a convex leading edge and also having its lateral extremities forming convex wing tips, and said rearward portion being of generally semi-circular plan form and merging in convex lines into said wing tips to form a convex trailing edge, laterally spaced propeller carrying projections on said leading edge forward of said wing tips, and stabilizing vanes oppositely extending from said rearward wing portion laterally outwardly beyond the axes of said wing tip vortices, said vanes comprising wing extensions and remaining fixed relative to said wing in flight.

CHARLES H. ZIMMERMAN.

REFERENCES CITED

The following references are of record in the file of this patent:

UNITED STATES PATENTS

| Number | Name | Date |
| --- | --- | --- |
| 1,391,355 | Woyevodsky | Sept. 20, 1921 |
| 1,512,428 | Linthicum | Oct. 21, 1924 |
| 1,768,708 | Myers | July 1, 1930 |
| 1,853,653 | Babula | Apr. 12, 1932 |
| 1,859,568 | Lesh | Sept. 20, 1921 |
| 1,887,411 | Johnson | Nov. 8, 1932 |
| 2,063,456 | Nemeth | Dec. 8, 1936 |
| 2,194,596 | Henter | Mar. 26, 1940 |

FOREIGN PATENTS

| Number | Country | Date |
| --- | --- | --- |
| 149,708 | Great Britain | Aug. 17, 1920 |

Certificate of Correction

Patent No. 2,431,293.  November 18, 1947.

CHARLES H. ZIMMERMAN

It is hereby certified that errors appear in the printed specification of the above numbered patent requiring correction as follows: Column 6, line 72, and column 7, lines 1, 6, and 12, for the claim reference numeral "7" read 5; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*